United States Patent [19]

Dillenschneider

[11] 3,937,862

[45] Feb. 10, 1976

[54] PNEUMATIC TIRES

[75] Inventor: Jean-Paul Dillenschneider, Beaumont, France

[73] Assignee: Compagnie Generale des Establissements Michelin, raison sociale Michelin & Cie, France

[22] Filed: June 14, 1974

[21] Appl. No.: 479,275

Related U.S. Application Data

[63] Continuation of Ser. No. 255,615, May 22, 1972, abandoned.

[30] Foreign Application Priority Data

June 2, 1971 France .................. 71.20047

[52] U.S. Cl. ............. 428/409; 152/353 C; 152/374; 152/DIG. 12; 156/116; 156/123; 428/493; 428/517; 428/521; 428/523

[51] Int. Cl.² ........................................ B32B 25/16

[58] Field of Search ............ 152/353, 374; 156/116, 156/123; 161/245, 247, 252, 253, 255; 428/409, 493, 517, 521, 523

[56] References Cited

UNITED STATES PATENTS

| | | | |
|---|---|---|---|
| 3,443,619 | 5/1969 | Kindle | 152/353 R |
| 3,508,595 | 4/1970 | Wilson | 152/353 R |
| 3,522,831 | 8/1970 | Torti et al. | 152/330 |
| 3,595,950 | 7/1971 | Mezynski | 264/130 |
| 3,651,176 | 3/1972 | Usamoto et al. | 260/897 C |
| 3,830,274 | 8/1974 | Waser | 152/353 R |

*Primary Examiner*—William J. VanBalen
*Attorney, Agent, or Firm*—Brumbaugh, Graves, Donohue & Raymond

[57] ABSTRACT

Tires, especially radial carcass tires, have the properties of their sidewalls improved by forming at least the outer surface of the sidewalls from organic peroxide vulcanizates of one or more mixes of elastomers of the diene type and of the ethylene-propylene type.

7 Claims, 1 Drawing Figure

U.S. Patent  Feb. 10, 1976  3,937,862
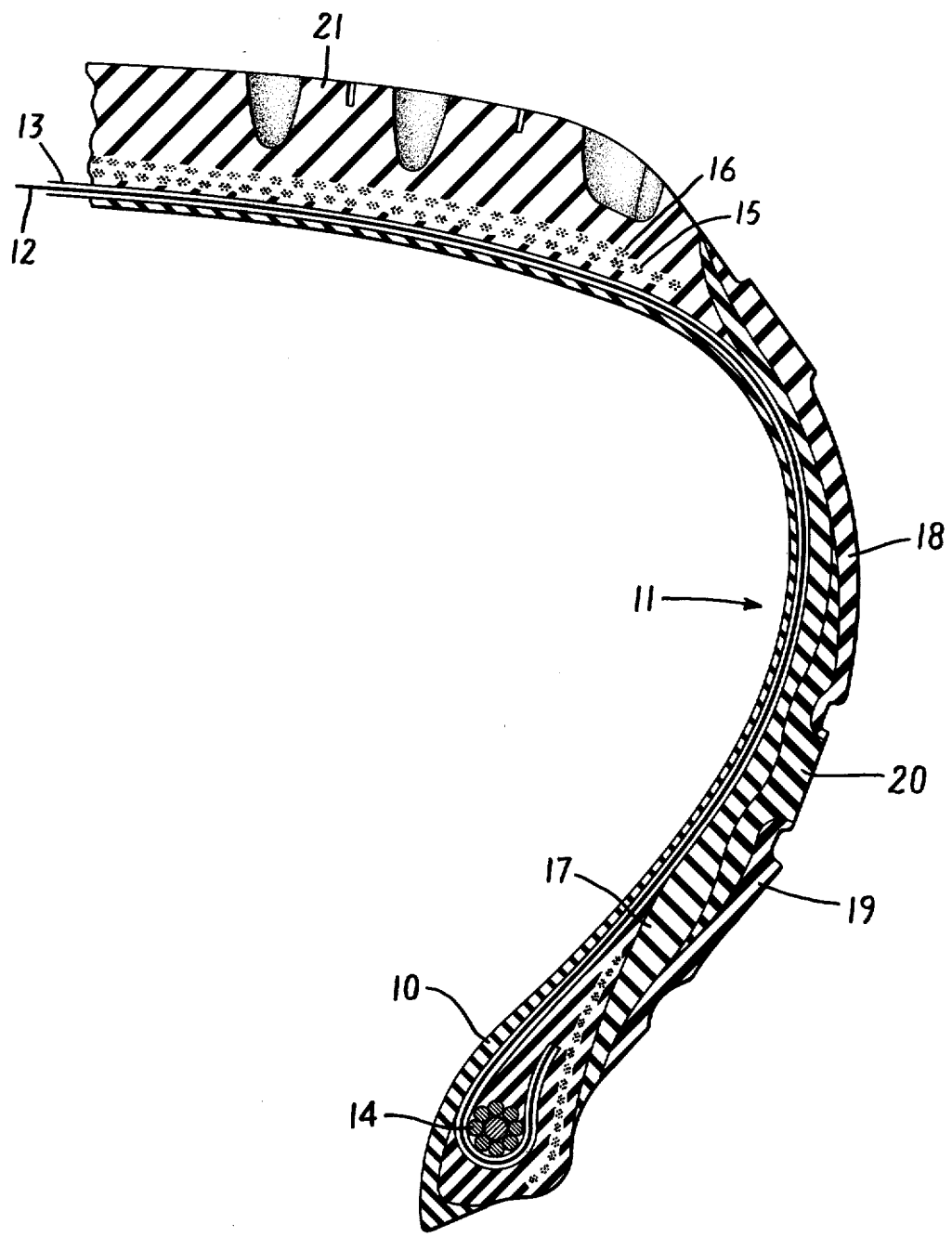

PNEUMATIC TIRES

This is a continuation of application Ser. No. 255,615, filed May 22, 1972, now abandoned.

The present invention relates to improvements in tires, particularly of the radial carcass type, by use of mixes which are particularly well adapted to the demands made on said tires and contain, in addition to ordinary elastomers of the diene type, also elastomers of the ethylene-propylene type.

The sidewalls of a tire, that is to say the outer covering of the carcass, require a very high fatigue strength. Upon each revolution, the sidewalls flex and the repeated flexings during the life of the tire reach an impressive number of the order of several tens of millions. The fatigue strength of the sidewall rubber must be particularly high in the case of radial carcass tires — in this type of tire the carcass is much more flexible, with the result that the deformation of the sidewalls and therefore the rate of working of the sidewall rubber are much greater than in the case of bias carcass tires.

In addition to high fatigue strength, the sidewalls require good protection from external agents and in particular from atmospheric ozone. Ozone in the long run causes the formation and propagation of cracks on and in the sidewalls and its action is more intense the more the elastomer is subjected to high stresses. In the absence of effective protection against ozone, the life of radial carcass tires may be limited in certain countries not by wear of the tread but by the action of ozone on the sidewalls, because of a relatively high amount of ozone in the atmosphere together with a hot, moist climate.

In order to impart to the sidewalls of tires both good resistance to fatigue and good resistance to ozone, the thought came to mind of incorporating in the sidewalls, in addition to the ordinary elastomers having good resistance to fatigue, also special elastomers having good resistance to ozone.

There was considered in particular the use of chloroprene — known also under the name of neoprene— and of terpolymers of ethylene, propylene and a copolymerizable diene.

Neoprene has the drawback that it is a very costly product and on the other hand does not supply complete protection against ozone. It therefore does not provide a solution which is fully satisfactory both from a technical and an economic standpoint. Elastomers of the ethylene-propylene type have the advantage that their cost is definitely more favorable than that of neoprene. However, whatever their extent of unsaturation, they have the drawback of insufficient compatibility of vulcanization with the diene elastomers, which leads to limiting the proportion of this type of elastomer which can be associated with the diene elastomers and therefore limiting the protection against ozone. In particular, mixes of a terpolymer of ethylene-propylene and natural rubber vulcanized with sulfur have satisfactory resistance to ozone if they contain sufficient terpolymer, but in such case the resistance to fatigue and the ability to adhere in the vulcanized state to conventional mixes leaves much to be desired. One is led to limit the proportion of terpolymer to 25 to 30% of the total of the elastomers. With this content the protection against ozone is insufficient, and while the cracks are less numerous, they are deeper; furthermore the fatigue strength, which is acceptable for a bias carcass tire, is insufficient for a radial carcass tire. Another drawback is noted — white mixes for sidewalls of the conventional type yellow under ultraviolet rays, despite the presence of elastomers of low unsaturation.

The present invention is directed at alleviating these drawbacks. It makes it possible to produce tires, and particularly radial carcass tires, whose sidewalls employ only relatively inexpensive elastomers having high resistance to flexure fatigue and to ozone, no tendency to undergo internal separation, and do not yellow, in the case of white sidewalls, under the action of ultraviolet rays.

The tire in accordance with the invention whose sidewalls are formed, at least on the outer surface, of one or more mixes of elastomers of the diene type and of the ethylene-propylene type is characterized by the fact that the portions of the sidewalls formed of the said mixes are vulcanized by means of an organic peroxide.

The ethylene-propylene elastomer which is of preferred use is an ethylene-propylene-diene terpolymer containing a small proportion, of the order of 5%, of a diene selected generally from among ethylidene norbornene, hexadiene-1,4, or, more exceptionally, from among methylene norbornene, dicyclopentadiene, cyclo-octadiene-1,5, and methyl tetrahydroidene. However, one can use an ethylene-propylene copolymer, which, however, has the drawback of being more difficult to work, of providing poorer protection against ozone for the same quantity, and of requiring more peroxide. In this connection, it is particularly surprising that it is advantageous to covulcanize with peroxides an ethylene-propylene-diene terpolymer into which a diene has been introduced to facilitate a sulfur vulcanization. This fact is all the more surprising since in general elastomers or blends of elastomers give the best results with sulfur, particularly with respect to fatigue strength.

The amount of elastomer of the ethylene-propylene type to be used is between about 15% and about 60% by weight of the total of the elastomers, the balance being formed of ordinary diene elastomers. A smaller amount — about 20% to about 30% by weight constitutes the preferable range — can be used with a terpolymer having a high content of macromolecules of high molecular weight, that is to say a terpolymer having a Mooney plasticity of more than about 100° at 100°C. or more than about 80° at 130°C. The best proportion is between about 30% and about 40% by weight for an ordinary terpolymer containing a relatively large number of macromolecules of relatively low molecular weight, that is to say, having a Mooney plasticity of between about 50 and about 100 at 100°C. As already stated, the use of an ethylene-propylene copolymer requires a higher proportion for the same effectiveness. However, one can use such a copolymer possibly mixed with a terpolymer.

The diene elastomer to be associated with the terpolymer or the copolymer of the ethylene-propylene type may be either natural rubber or a synthetic rubber of the polybutadiene type, a polyisoprene, a styrene-butadiene copolymer (SBR), or else a mixture of natural rubber and/or the above synthetic rubbers. The use of different types of diene elastomers obviously makes it possible to obtain a compromise between the advantages and disadvantages of the different elastomers. One can also use an elastomer similar to diene elastomers, such as transpolypentene.

The amount of organic peroxide to be used is from about 1 to about 10 parts by weight per 100 parts by weight of elastomers, and preferably from about 2 to about 5 parts by weight, in the case of commercial organic peroxides containing 40% by weight of active product.

Among the organic peroxides which can be employed, mention may be made by way of example of dicumyl peroxide, aryl or diaryl peroxides, diacetyl peroxide, benzoyl peroxide, dibenzoyl peroxide, di-tert.-butyl peroxide, tert.-butylcumyl peroxide, 2,5-bis(tert.-butylperoxy)-2,5-dimethyl hexane, etc.

There are available on the market various packaged products known under their trademarks; mention may be made of:

Dicup 40, manufactured by Hercules Powder Co., containing 40% dicumyl peroxide,

Perkadox Y12, manufactured by Noury van der Lande, containing 40% bis(tert.-butyl-peroxy-isopropyl) benzene, Peroximon F40, manufactured by Montecatini Edison, S.p.A., containing 40% bis(tert.-butyl-peroxy) diisopropyl benzene, Trigonox, manufactured by Noury van der Lande, containing 40% 1,1-di-tert.-butyl-peroxy 3,3,5-trimethyl cyclohexane, Varox, manufactured by R. T. Vanderbilt Co., containing 50% 2,5-dimethyl-2,5-di(tert.-butyl peroxy) hexane, Luperko, manufactured by Wallace & Tiernan, Inc., containing 45% 2,5-dimethyl-2,5-bis(tert.-butyl peroxy) hexyne-3.

Together with the organic peroxide and in order to reduce the quantity thereof, it is favorable to employ as activator for the peroxide a product such as sulfur, methacrylates, such as allylmethacrylate, ethyleneglycol dimethacrylate, polyethylene-glycol dimethacrylate, trimethylol-propane trimethacrylate, etc., or the condensation product of furfural and acetone.

The sulfur is employed in very small amount (e.g., from about 0.1 to about 0.3 part by weight for every 100 parts by weight of elastomers), which amount would not be sufficient for vulcanization in the absence of peroxide and accelerator.

The mixture includes, in addition to the elastomers and the vulcanization system, also the customary ingredients such as antioxidant, extender or plasticizing oil, fillers (carbon black, silica, titanium and zinc oxides), in proportions similar to those found in sidewall rubbers, depending on the properties desired. Thus, the mixtures contain from about 30 to about 65 parts by weight of carbon black per 100 parts by weight of elastomer.

The vulcanization by the peroxides of sidewall mixes having a base of elastomers of the ethylene-propylene type associated with diene elastomers surprisingly results in a number of advantages over the sulfur-vulcanized mixtures, namely:

1. Improvement in the resistance to ozone for an equal amount of ethylene-propylene elastomer. This advantage is the greater the more ethylene-propylene-diene terpolymer is used and the higher its average molecular weight;

2. Improvement of the adherence to conventional mixes in vulcanized condition: the sidewall rubber adheres better to the carcass and therefore, without risk of internal separation in the sidewall, one can use more elastomer of ethylene-propylene type and therefore enjoy better protection against ozone;

3. Improvement in the resistance to fatigue, particularly due to flexure. This result is particularly surprising since the fatigue strength of the vulcanized products of ordinary diene elastomers, in particular natural rubber, and also of the ethylene-propylene terpolymers used alone, is poorer when an organic peroxide is used as the vulcanizing agent instead of sulfur;

4. Elimination of the yellowing of white mixes under the action of ultraviolet rays;

5. Improvement of the mechanical properties (in particular rupture force) and elasticity (loss by hysteresis).

The advantages provided by the invention are of such a nature that they make it possible to employ blends of diene elastomers and copolymers or terpolymers of ethylene-propylene as sidewall rubber of radial carcass tires, which was unknown and impossible prior to the invention.

The accompanying drawing shows a tire in accordance with the invention, seen in a radial or transverse half section.

In this drawing, various component elements of the tire can be noted, namely, the inner covering 10, the carcass composed of cords 12 embedded in a calendering rubber 13 and anchored around bead wires 14, a crown reinforcement composed of two plies 15 and 16 preferably of metal cords, its outer sidewall 11 being formed of four layers of rubber 17, 18, 19 and 20, and a tread 21. The sidewall rubber layer 17, placed on the carcass cords 12 embedded in the calendering rubber 13, is a conventional mix having a base of diene elastomers. The layer 17 is covered with layers 18 and 19 of black mix, and with the layer 20 of white mix. These surface layers 18, 19 and 20 are formed in accordance with the invention of mixes having a base of one or more diene elastomers and one or more elastomers of the ethylene-propylene copolymer type or ethylene-propylene-diene terpolymer type, these mixes being vulcanized by an organic peroxide and containing less than 0.5 part by weight of sulfur per 100 parts by weight of elastomers. As a variant, the layer 17 could be made of a mix of the same type as the layers 18, 19 and 20. The opposite or inner sidewall of this tire, not shown, does not contain a white-mix layer, it being replaced by a black-mix layer of the same nature as the layers 18 and 19. Thus, as shown in the drawing, the outer surface layer portions have a thickness at least about one-fourth the thickness of the sidewalls.

The following examples show various manners of carrying out the invention and bring out the advantages of the various compositions, in particular as compared with a conventional vulcanization with sulfur.

In order to facilitate the description of the examples and avoid repetitions, it is advisable first of all to give certain information which applies to several examples.

a. Base Composition

Without exception, all the examples use the following base compositions indicated per 100 parts by weight of elastomers:

| Base Composition | A | A$_1$ | A$_2$ | B | C | C$_1$ | C$_2$ | C$_3$ | D | D$_1$ | D$_2$ | D$_3$ |
|---|---|---|---|---|---|---|---|---|---|---|---|---|
| EPT | 35 | 40 | 50 | 35 | 35 | 30 | 25 | 20 | 35 | 40 | 35 | 35 |
| Natural rubber | 65 | 60 | 50 | 65 | 30 | 35 | 40 | 45 | 65 | 60 | 30 | — |
| SBR 1502 | — | — | — | — | 35 | 35 | 35 | 35 | — | — | 35 | 65 |
| Antioxidant | | 1 | | 1 | | 1 | | | | 1 | | |
| Stearic acid | | 1 | | 1 | | 1 | | | | 1 | | |
| FEF Black | | 35 | 30 | | | 35 | | | | — | | |
| Oil | | 8 | 5 | | | 5 | | | | — | | |
| Zinc oxide | | 5 | 5 | | | 5 | | | | 35 | | |
| Titanium oxide | — | — | — | | | — | | | | 40 | | |

The EPT's (ethylene-propylene-diene terpolymers) used in the above compositions are Epsyn 55 in Compositions A and D and variants, and Nordel 1470 in Compositions B and C and variants, except if another ethylene-propylene terpolymer or copolymer is specified.

Epsyn 55 is an ethylene-propylene-ethylidene norbornene terpolymer with 44% propylene, an iodine number of 24, and Mooney viscosity of 84 at 100°C., manufactured by the Copolymer Rubber and Chemical Corp.

Nordel 1470 is an ethylene-propylene-hexadiene-1,4 terpolymer containing 39% propylene, an iodine number of about 20, and a Mooney viscosity of 82 at 100°C., manufactured by E. I. Du Pont de Nemours & Co.

b. Vulcanization System

In most of the examples, for every 100 parts by weight of elastomers, there is used the peroxide system P comprising 0.21 part by weight of sulfur and 3.5 parts by weight of Dicup 40 which contains 40% dicumyl peroxide as active product. Some examples employ the same ingredients in the same relative proportion but in smaller or larger quantity for the same amount of elastomer, or else a different commercial peroxide in equivalent proportion.

Peroxide vulcanization is compared with various sulfur vulcanizations in accordance with the following systems (based on 100 parts of elastomers);

|  | S$_1$ | S$_2$ | S$_3$ | S$_4$ |
|---|---|---|---|---|
| Sulfur | 1.4 | 1.5 | 1 | 3 |
| MBTS (mercaptobenzothiazole disulfide) | 0.6 | — | — | 1.2 |
| DPG (diphenyl guanidine) or DOTG (diortholyl guanidine) | 0.4 | 0.3 | — | — |
| Santocure (N-cyclohexyl-2-benzothiazole sulfenamide) | — | 0.8 | — | — |
| Tuads (tetramethyl thiuram disulfide) | — | — | 1 | — |
| MBT (mercaptobenzothiazole) | — | — | 0.5 | — |

Finally, a mixed vulcanization system (M) containing for every 100 parts of elastomers 0.3 part of sulfur, 2.5 parts of Dicup-40 and 0.5 part of Santocure was also tested.

In all cases the mixes were vulcanized for 15 minutes at 164°C.

C. Tests

The flexure fatigue tests were carried out by means of the De Mattia test. A test specimen of a width of 25 mm, a length of 150 mm, and a thickness of 6 mm, having a transverse groove of a depth of 3 mm, was subjected to repeated flexings. The width in millimeters of the cut is measured at the end of a given number of cycles. The formation of the notch by flexing can be facilitated by an initiation.

Verification of the action of ozone is carried out by placing a testpiece of a length of 50 mm, a width of 20 mm, and a thickness of 2.5 mm in an ozone chamber and subjecting it to elongations of 25% at a frequency of 30 cycles per minute for 48 hours. The length of the notches is measured in millimeters.

The adherence test is carried out by covulcanizing two testpieces over a part of their surfaces, one of them consisting of the control mix and the other of the mix to be adhered. The force in kg necessary to separate the two testpieces is measured. When the adherence is good, the separation takes place within the thickness of one of the testpieces and it is stated that there is cleavage (letter C in the following tables). When the adherence is poor, the separation takes place at the interface of the two testpieces, and then it is said that there is separation (letter D in the tables). The control mixes used have the following formulas:

|  | T$_1$ | T$_2$ | T$_3$ | T$_4$ |
|---|---|---|---|---|
| Natural rubber | 50 | — | 100 | 50 |
| Polybutadiene | 15 | — | — | — |
| SBR 1500 | 35 | 100 | — | — |
| Neoprene | — | — | — | 50 |
| Stearic acid | 1 | 1 | 1 | 1 |
| Antioxidant | 2 | 1.5 | 1 | 1 |
| HAF Black | 55 | — | 35 | 35 |
| ISAF Black | — | 65 | — | — |
| Oil | 20 | 30 | — | 10 |
| ZnO | 3 | 3 | 3 | 5 |
| Sulfur | 1.6 | 1.8 | 2.0 | 1 |
| Santocure | 1 | 0.7 | 0.7 | — |
| 2-mercapto-imidozoline | — | — | — | 0.7 |

EXAMPLE 1

In this example the properties of two mixes, vulcanized with peroxides in accordance with the invention, for sidewalls of radial carcass tires are compared with three similar mixes vulcanized with sulfur and suitable only for sidewalls of biased carcass tires:

| Mix No. | 1 | 2 | 3 | 4 | 5 |
|---|---|---|---|---|---|
| Base composition | A | A | B | B | B |
| Vulcanization system | P | S$_1$ | P | S$_2$ | S$_3$ |
| Modulus at 100%, kg/cm$^2$ | 99 | 129.5 | 106 | 125 | 160 |
| Loss at 60 C., % | 26.4 | 27.3 | 22.7 | 26.3 | 23.8 |
| Rupture strength, kg/cm$^2$ | 168 | 120 | 146 | 94 | 64 |
| Elongation at rupture, % | 625 | 525 | 660 | 500 | 330 |

-continued

| Mix No. | 1 | 2 | 3 | 4 | 5 |
|---|---|---|---|---|---|
| De Mattia with initiation (160,000 cycles) | 9 | 14 | 4 | 16 | 25 |
| De Mattia without initiation (500,000 cycles) | 2 | 25 | 0 | 22 | 25 |
| Action of ozone | 0 | 0 | 0 | 0 | 0 |
| Adherence to $T_1$ | C 8 kg | D 5 kg | C 12–15 kg | C 6–11 kg | D 3–4 kg |
| Adherence to $T_2$ | C 40 kg | C 20 kg | C 15 kg | C 10 kg | C 3–4 kg |

The peroxide vulcanization remarkably improves the rupture strength, the resistance to flexure fatigue and the adherence.

EXAMPLE 2

In this example there are compared various mixes of the invention which differ from each other in the nature and proportion of the elastomer of ethylene-propylene type.

Peroxide vulcanization gives results superior to sulfur vulcanization, even with a substantially higher proportion of EPT. This example also shows that the use of EPT is preferable over that of the EPR (ethylene-propylene copolymer).

EXAMPLE 3

In this example on the one hand various diene elastomers are compared and on the other hand there is shown the possibility of using a reduced amount of a terpolymer having a high content of macromolecules of high molecular weight.

An SBR can be used as diene elastomer. On the other hand, with an EPT having a high content of macromolecules of high molecular weight such as Nordel 1700, one can use a reduced proportion of EPT and obtain good protection against ozone.

Nordel 1700 is an ethylene-propylene-hexadiene-1,4 terpolymer with 30% propylene, and a Mooney viscosity at 100°C. of 135, manufactured by E. I. Du Pont de Nemours & Co.

| Mix No. | 6 | 7 | 8 | 9 | 10 | 11 | 12 |
|---|---|---|---|---|---|---|---|
| Base composition | A | $A_1$ | $A_2$ | A | A | A | A |
| EPT or EPR | ←——— Nordel 1470 ———→ | | | Epsyn 70 | Keltan 820 | EPR 404 | Epsyn 55 |
| % EPT | 35 | 40 | 50 | 35 | 35 | 35 | 35 |
| System of vulcanization | P | P | P | P | P | P | $S_1$ |
| Modulus at 100%, kg/cm² | 91.5 | 88 | 92 | 104 | 106 | 91 | 117 |
| Loss at 60°C., % | 21.6 | 23.1 | 24.9 | 24.7 | 24.1 | 28.1 | 28.1 |
| Rupture strength, kg/cm² | 192 | 178 | 166 | 156 | 186 | 118 | 120 |
| Elongation at rupture, % | 650 | 667 | 675 | 590 | 610 | 597 | 550 |
| De Mattia with initiation | | | | | | | |
| 500,000 cycles | 4 | 4 | 2 | | | | 25 |
| 320,000 cycles | | | | 11 | 15 | 12 | |
| De Mattia without initiation | | | | | | | |
| 1,600,000 cycles | 4 | 2 | 0 | | | | 25 |
| 500,000 cycles | | | | 5 | 10 | 5 | 25 |
| Action of Ozone | 0 | 0 | 0 | 0 | 0 | 5 | 0 |
| Adherence to $T_1$ | C 37–42 kg | C 24–49 kg | C 19–27 kg | — | — | D 10–14 kg | C 13–27 kg |

The characteristics of the EPT's and EPR's used as well as those of similar EPT's or EPR's are indicated below:

| Tradename | Propylene % | Diene | Mooney viscosity at 100° | Manufactured by |
|---|---|---|---|---|
| NORDEL 1470 | 39 | 1,4-hexadiene | 82 | E. I. Du Pont de Nemours & Co. |
| NORDEL 1070 | 42 | " | 83 | |
| NORDEL 1700 | 30 | " | 135 | |
| EPSYN 55 | 44 | Ethylidene-norbornene | 84 | Copolymer Rubber and Chemical Corp. |
| Epsyn 70 | 42 | " | 97 | |
| EPSYN 70A | 43 | " | 100 | |
| KELTAN 820 | 50 | Dicyclopentadiene | 93 | Dutch Staatsmijnen (DSM) |
| KELTAN 712 | 38 | Ethylidene-norbornene | 97 | |
| KELTAN 578 | 28 | " | 89 | |
| KELTAN 714 PO III | 38 | " | 83 | |
| INTOLAN 255 | 23 | " | 81 | International Synthetic Rubber Co. Ltd. |
| VISTALON 3708 | 26 | " | 83 | Esso Research S.A. |
| EPR 404 | 60 | none | 43 | |

| Mix No. | 13 | 14 | 15 | 16 | 17 | 18 |
|---|---|---|---|---|---|---|
| Base composition | B | C | C | $C_1$ | $C_2$ | $C_3$ |
| EPT | ←— NORDEL 1470 —— | | | —— NORDEL 1700 ——→ | | |
| % EPT | 35 | 35 | 35 | 30 | 25 | 20 |

-continued

| Mix No. | 13 | 14 | 15 | 16 | 17 | 18 |
|---|---|---|---|---|---|---|
| System of vulcanization | P | P | P | P | P | P |
| Modulus at 100%, kg/cm$^2$ | 89 | 109 | 158 | 152 | 141 | 149 |
| Loss at 60°C, % | 22.5 | 24.1 | 24.4 | 23.4 | 23.1 | 21.9 |
| Rupture strength, kg/cm$^2$ | 170 | 138 | 140 | 144 | 146 | 170 |
| Elongation at rupture, % | 695 | 650 | 490 | 510 | 510 | 520 |
| De Mattia with initiation 500,000 cycles | 5 | 5 | 25 | 11 | 11 | 11 |
| De Mattia without initiation 500,000 cycles | 2 | 2 | 0 | 0 | 0 | 4 |
| Action of Ozone | 0 | 0 | 0 | 0 | 0 | 0 |
| Adherence to T$_1$ | C / 10 kg | C / 15 kg | C / 5 kg | C / 7 kg | C / 10 kg | — |

Example 4

In this example mixes vulcanized with different amounts and types of peroxides are compared.

| Mix No. | 19 | 20 | 21 | 22 | 23 |
|---|---|---|---|---|---|
| Base composition | A | A | A | A | A |
| System of vulcanization | P × 4/7* | P | P × 10/7* | P | M |
| Modulus at 100%, kg/cm$^2$ | 66.7 | 91.5 | 109 | 87.5 | 96.9 |
| Loss at 60°C, % | 30 | 21.6 | 18.7 | 22.9 | 24.1 |
| Rupture strength, kg/cm$^2$ | 156 | 192 | 190 | 182 | 156 |
| Elongation at rupture, % | 770 | 650 | 590 | 670 | 660 |
| De Mattia with initiation 500,000 cycles | 3 | 5 | 10 | 4 | 7 |
| De Mattia without initiation 1,600,000 cycles | 2 | 3 | 5 | 1 | 4 |
| Action of Ozone | 0 | 0 | 0 | 0 | 0 |
| Adherence to T$_1$ | D / 5–6 kg | D / 5–7 kg | C / 7–10 kg | D / 6–18 kg | |
| Adherence to T$_2$ | C / 12–28 kg | C / 37–38 kg | C / 38–45 kg | C / 30–45 kg | |
| Adherence to T$_3$ | — | C / 37–42 kg | — | — | C / 43–46 kg |

*System P, but in an amount reduced or increased in the proportion of 4/7 or 10/7.

The increase in the amount of organic peroxide reduces the resistance to flexure fatigue but improves the adherence.

In place of the Dicup 40, one can use an equivalent amount of another organic peroxide (instead of 3.5 parts by weight of Dicup 40, 2.8 parts by weight of Peroximon F40 in mix No. 22).

A mixed sulfur and peroxide vulcanization can be used, but this is not of any particular advantage.

EXAMPLE 5

As shown by the following example, different types of fillers and in different quantites can be used.

| Mix No. | 24 | 25 | 26 | 27 |
|---|---|---|---|---|
| Base composition | C | C | C | C |
| FEF Black | 30 | — | 40 | 50 |
| SAF Black | — | 30 | — | — |
| Oil | 5 | 5 | 7 | 10 |
| System of vulcanization | P | P | P | P |
| Modulus at 100%, kg/cm$^2$ | 110 | 104 | 128 | 149 |
| Loss at 60°C, % | 24.7 | 28.8 | 28.1 | 31.4 |
| Rupture strength, kg/cm$^2$ | 144 | 172 | 138 | 128 |
| Elongation at rupture, % | 620 | 650 | 570 | 470 |
| Action of Ozone | 0 | 0 | 0 | 0 |
| De Mattia with initiation 240,000 cycles | 2 | 3 | 6 | 14 |
| De Mattia without initiation 500,000 cycles | 0 | 0 | 1 | 3 |
| Adherence to T$_1$ | C / 9–16 kg | C / 11–14 kg | D / 5–6 kg | D / 4–5 kg |
| Adherence to T$_2$ | C / 16–35 kg | C / 14–21 kg | C / 26–46 kg | C / 13–23 kg |

The increase in the filler can reduce the adherence and the fatigue strength.

EXAMPLE 6

This example relates to the manufacture of white sidewalls.

| Mix No. | 28 | 29 | 30 | 31 | 32 | 33 | 34 | 35 | 36 |
|---|---|---|---|---|---|---|---|---|---|
| Base composition | D | D$_1$ | D | D$_1$ | D$_2$ | D$_3$ | D | D | D |
| EPT | ←——————— Epsyn 55 ———————→ | | | | | | Keltan 820 | Nordel 1470 | Intelan 255 + Nordel 1470 |
| % EPT | 35 | 40 | 35 | 40 | 35 | 35 | 35 | 35 | 35 |

-continued

| Mix No. | 28 | 29 | 30 | 31 | 32 | 33 | 34 | 35 | 36 |
|---|---|---|---|---|---|---|---|---|---|
| % SBR | — | — | — | — | 35 | 65 | — | — | — |
| System of vulcanization | S$_4$ | S$_4$ | P | P | P | P | P | P | P |
| Modulus at 100%, kg/cm$^2$ | 102 | 101 | 78 | 80 | 80 | 88 | 87 | 75 | 89 |
| Loss at 60°C, % | 20.8 | 22.7 | 20 | 21.5 | 26 | 27.4 | 19 | 17 | 18.1 |
| Rupture strength, kg/cm$^2$ | 126 | 116 | 168 | 153 | 88 | 68 | 168 | 189 | 204 |
| Elongation at rupture, % | 750 | 770 | 760 | 760 | 710 | 700 | 775 | 810 | 810 |
| Shore hardness | 49 | 50 | 45 | 46 | 49 | 50 | 45 | 43 | 46 |
| Action of Ozone | 0 | 0 | 0 | 0 | 0 | 0 | 0 | 0 | 0 |
| Ultraviolet exposure | yellow | yellow | white | white | white | white | white | white | white |
| Adherence to T$_4$ | D 7–10 | D 4–5 | C 8–17 | C 6–10 | C 8–10 | C 3–5 | C 7–16 | C 5–15 | C 6–14 |

Vulcanization with peroxides considerably improves the adherence, avoids the yellowing and permits the use of SBR's instead of natural rubber.

The laboratory tests described in the above examples have been confirmed by tests on tires. Before the invention only the addition of neoprene to the sidewall rubber of radial carcass tires permitted protection against ozone and against aging without unacceptable loss of fatigue strength and excessive risk of internal separation. The use of elastomers of the ethylene-propylene type leads to a far inferior solution when the vulcanization is effected with sulfur and on the other hand a far superior solution when operating with peroxide vulcanization. It is, to say the least, curious that a system of vulcanization which generally gives less favorable results and which one tends to avoid systematically in the rubber industry is found in this case to be the best.

It goes without saying that the invention, although directed primarily at tires of radial type, can also be used advantageously on bias carcass tires with or without tread reinforcement.

What is claimed is:

1. A radial carcass tire whose sidewalls are formed, at least on the outer surface layer thereof, of at least one surface layer mixture comprising nonhalogenated elastomers both of the diene type selected from the group consisting of natural rubber, polybutadiene, polyisoprene, styrene-butadiene copolymer and transpolypentene mixed with an ethylene-propylene type selected from the group consisting of ethylene-propylene copolymer and ethylene-propylene-diene terpolymer containing on the order of 5% diene, characterized by the fact that the outer surface layer portions of the sidewalls formed of said mixes are vulcanized by means of an organic peroxide, the amount of organic peroxide used being from about 1 to about 10 parts by weight per 100 parts by weight of elastomers of a commercial organic peroxide containing 40% by weight of active product, said sidewalls having high flexure fatigue resistance, said outer surface layer portions having a thickness at least about one fourth the thickness of the sidewalls, said mixture containing from about 30 to about 65 parts by weight of carbon black per 100 parts by weight of elastomers, and the amount of said elastomer of the ethylene-propylene type used being between about 15% and about 60% by weight of the total of the elastomers.

2. The tire as defined by claim 1 wherein the ethylene-propylene-diene terpolymer is between about 20% and about 30% by weight elastomer of an ethylene-propylene-diene terpolymer having a Mooney viscosity of more than about 100 at 100°C., or more than about 80 at 130°C.

3. The tire as defined by claim 1 wherein the ethylene-propylene-diene terpolymer is between about 30% and about 40% by weight elastomer of an ethylene-propylene-diene terpolymer having a Mooney viscosity of between about 50 and about 100 at 100°C.

4. The tire as defined by claim 1 wherein the sidewall layer is vulcanized by means of from about 2 to about 5 parts by weight of an organic peroxide, containing 40% active product, per 100 parts by weight of elastomers, the organic peroxide being activated by from about 0.1 to about 0.3 part by weight of sulfur per 100 parts by weight of elastomers.

5. The tire as defined by claim 1 wherein the sidewall layer contains at least half of the elastomer of diene type in the form of synthetic rubber of a butadiene-styrene copolymer.

6. The tire as defined by claim 1 wherein its sidewalls have several juxtaposed layers of mixed elastomers of the diene type and of the ethylene-propylene type, including at least one white mix, said white mix also being vulcanized by means of an organic peroxide.

7. The tire as defined by claim 1 wherein the sidewalls contain an elastomer of the ethylene-propylene type which, in part or in its entirety, is an ethylene-propylene copolymer.

* * * * *